United States Patent
Park et al.

(10) Patent No.: US 10,483,900 B2
(45) Date of Patent: Nov. 19, 2019

(54) SYSTEM AND METHOD FOR CONTROLLING INVERTER FOR DRIVING MOTOR

(71) Applicants: Hyundai Motor Company, Seoul (KR); Kia Motors Corp., Seoul (KR)

(72) Inventors: Joo Young Park, Yongin-si (KR); Mu Shin Kwak, Hwaseong-si (KR); Jae Ho Hwang, Daejeon (KR); Su Hyun Bae, Daegu (KR); Yong Jae Lee, Hwaseong-si (KR); Sung Kyu Kim, Bucheon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 16/132,691

(22) Filed: Sep. 17, 2018

(65) Prior Publication Data

US 2019/0260326 A1  Aug. 22, 2019

(30) Foreign Application Priority Data

Feb. 21, 2018  (KR) ........................ 10-2018-0020797

(51) Int. Cl.
| | | |
|---|---|---|
| H02P 27/08 | (2006.01) | |
| H02P 21/22 | (2016.01) | |
| H02M 7/5395 | (2006.01) | |
| H02P 6/16 | (2016.01) | |
| H02M 1/00 | (2006.01) | |

(52) U.S. Cl.
CPC ........ *H02P 27/085* (2013.01); *H02M 7/5395* (2013.01); *H02P 6/16* (2013.01); *H02P 21/22* (2016.02); *H02M 2001/0009* (2013.01)

(58) Field of Classification Search
CPC ..................................... H02P 27/085
USPC ................. 318/811, 810, 807, 767, 727
See application file for complete search history.

(56) References Cited

U.S. PATENT DOCUMENTS 7,250,740 B2 *  7/2007  Katsuki ............ H02M 7/53873
318/400.13

FOREIGN PATENT DOCUMENTS

KR  10-2015-0049424 A  5/2015
KR  10-2015-0062291 A  6/2015

* cited by examiner

*Primary Examiner* — David Luo
(74) *Attorney, Agent, or Firm* — Morgan, Lewis & Bockius LLP

(57) ABSTRACT

A system for controlling an inverter may include a motor; then inverter including a plurality of switching elements turned on/off by a pulse width modulation signal, converting DC power into AC power according to on/off of the plurality of switching elements and providing the AC power to the motor; a current sensor for detecting and outputting a current provided to the motor; a rotation angle sensor for detecting and outputting a rotor angle of the motor; and a controller for performing duty determination control for determining a duty of the pulse width modulation signal on the basis of values detected by the current sensor and the rotation angle sensor and a torque command of the motor.

13 Claims, 4 Drawing Sheets

SYSTEM AND METHOD FOR CONTROLLING INVERTER FOR DRIVING MOTOR

CROSS REFERENCE TO RELATED APPLICATION

The present application claims priority to Korean Patent Application No. 10-2018-0020797, filed Feb. 21, 2018, the entire contents of which is incorporated herein for all purposes by this reference.

BACKGROUND OF THE INVENTION

Field of the Invention

The present invention relates to a system and method for controlling an inverter for driving a motor, and more specifically, to a system and method for controlling an inverter for driving a motor to improve control characteristics in consideration of characteristics of a control technique of pulse width modulation without increasing the frequency of a pulse width modulation signal.

Description of Related Art

In general, a system for driving a motor may include a power storage device (e.g., a battery), an inverter for converting DC power stored in the power storage device into AC power for driving a motor, and the motor.

Here, the inverter may include a plurality of switching elements and generates AC power by controlling the switching elements through pulse width modulation (PWM). The AC power generated through the inverter is provided to the motor such that the motor operates.

A pulse width modulation signal used for PWM control of the switching elements included in the inverter is a pulse signal having high and low states which are repeated at predetermined intervals, and a duty cycle or a duty ratio which is the ratio of sections that the pulse width modulation signal is high may be controlled to adjust a power level provided to the motor.

When the pulse width modulation signal has a high frequency, harmonics of a driving voltage and driving current provided to the motor decrease and a control cycle in connection with the pulse width modulation signal becomes faster and thus motor control characteristics may be improved. On the other hand, a high frequency of the pulse width modulation signal may cause loss due to frequent switching of the switching elements to decrease efficiency.

Various techniques for reducing harmonics and improving control characteristics while decreasing the frequency of the pulse width modulation signal in consideration of such characteristics of the PWM control technique are studied.

Details described as the background art are intended merely for promoting the understanding of the background of the present invention and may not be construed as an acknowledgment of the related art which is not known to those of ordinary skill in the art.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for controlling an inverter for driving a motor to improve controllability by increasing the number of detection signal sampling operations and control operations for motor control without causing switching loss due to increase in the frequency of a pulse width modulation signal.

To accomplish the object, various aspects of the present invention are directed to providing a system for controlling an inverter for driving a motor, the system including: a motor; an inverter including a plurality of switching elements turned on/off by a pulse width modulation signal, converting DC power into AC power according to on/off of the plurality of switching elements and providing the AC power to the motor; a current sensor for detecting and outputting a current provided to the motor; a rotation angle sensor for detecting and outputting a rotor angle of the motor; and a controller for performing duty determination control for determining a duty of the pulse width modulation signal on the basis of values detected by the current sensor and the rotation angle sensor and a torque command of the motor, associating a time at which the duty determination control is performed with the pulse width modulation signal, and arbitrarily changing the time at which the duty determination control is performed by changing a point in time at which a section that the pulse width modulation signal is high appears depending on a random setting time.

In an exemplary embodiment of the present invention, the controller may change the point in time at which a section that the pulse width modulation signal is high appears to be depending on the random setting time while maintaining the cycle of the pulse width modulation signal.

In an exemplary embodiment of the present invention, the controller may perform the duty determination control at points in time before and after a rising edge of the pulse width modulation signal, which are separated from the rising edge, and start time of one duty determination control may be a time elapsed from a start time of two preceding duty determination controls by one cycle of the pulse width modulation signal.

In an exemplary embodiment of the present invention, the controller may include: a random number generator for generating the random setting time; a sampling unit for sampling signals output from the current sensor and the rotation angle sensor at a sampling time determined using the random setting time generated by the random number generator to generate a current detection value and a rotation angle detection value: a current controller for generating a voltage command of each phase of the motor on the basis of the current detection value and the rotation angle detection value generated by the sampling unit and a current command corresponding to the torque command of the motor; and a pulse width modulation signal generator for generating a pulse width modulation signal for controlling on/off of the switching elements of the inverter to output a voltage of each phase corresponding to the voltage command, and changing a point in time corresponding to a section that the pulse width modulation signal is high depending on the random setting time.

In an exemplary embodiment of the present invention, the random number generator may limit the size of the random setting time on the basis of the cycle of the pulse width modulation signal and a time limit predetermined for the duty determination control.

In an exemplary embodiment of the present invention, the random number generator may limit the size of the random setting time according to the following expression, (PWM cycle×0.5)−(time limit for duty determination control)≥α(α being the random setting time).

To accomplish the object, various aspects of the present invention are directed to providing a method for controlling an inverter for driving a motor, the method including: determining a random setting time; determining a sampling time depending on the random setting time and sampling a motor driving current detection signal and a motor rotor angle detection signal at the determined sampling time; and generating a pulse width modulation signal for controlling on/off of switching elements included in an inverter providing driving power to a motor on the basis of the sampled values and a torque command of the motor, wherein a point in time at which a section that the pulse width modulation signal is high, generated in the generating of the pulse width modulation signal, appears is changed depending on the random setting time, and the sampling time is associated with the pulse width modulation signal.

According to the system and method for controlling an inverter for driving a motor, controllability may be improved by performing sampling and duty determination control twice within one cycle of the pulse width modulation signal, and noise, vibration and harshness of a system to which a motor is applied may be reduced by arbitrarily determining a sampling time and a duty determination control time using a random setting time.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
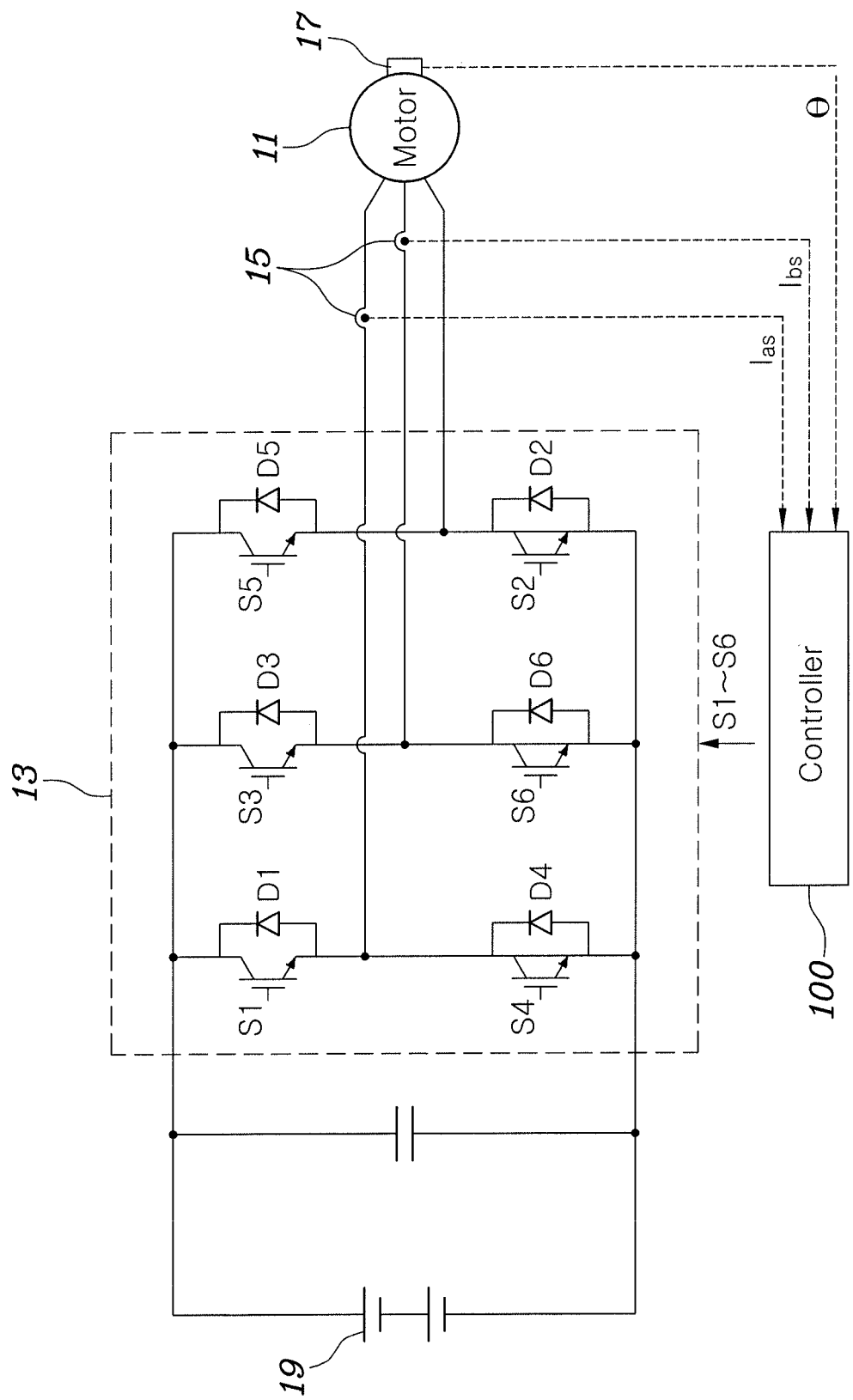
FIG. 1 is a circuit diagram of a system for controlling an inverter for driving a motor according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, a system for controlling an inverter for driving a motor according to various embodiments will be described in more detail with reference to the appended drawings.

FIG. 1 is a circuit diagram of a system for controlling an inverter for driving a motor according to an exemplary embodiment of the present invention.

Referring to FIG. 1, the system for controlling an inverter for driving a motor according to an exemplary embodiment of the present invention may include a motor, an inverter 13, a current sensor 15, a rotation angle sensor 17 and a controller 100.

The motor 11 is a component which receives three-phase AC power supplied from the inverter 13 to generate torque. Various types of motors known in the art may be employed as the motor 11.

The inverter 13 is a component for converting DC power stored in a power supply device (e.g., a battery) 19 into AC power for driving the motor and may include a plurality of switching elements S1 to S6 having on/off states controlled by a pulse width modulation (PWM) signal provided by the controller 100.

The current sensor 15 detects driving current $I_{as}$ and $I_{bs}$ of each phase supplied from the inverter 13 to the motor 11. The current sensor 15, which is generally an analog device, continuously detects the driving current $I_{as}$ and $I_{bs}$ and continuously outputs current detection signals including information related to detected current levels.

The rotation angle sensor 17 is a component which detects the position of a rotor of the motor, that is, a rotation angle of the rotor of the motor, and may continuously detect the angle of the rotor of the motor 11 and continuously outputs rotation angle detection signals including information related to detected rotation angles of the rotor, similar to the current sensor 15.

The controller 100 may perform PWM control for appropriately adjusting duty cycles (duty ratios) of the switching elements S1 to S6 of the inverter 13 to control the torque of the motor 11 to be a desired value. For such control, the controller 100 samples detection signals provided by the current sensor 15 and the rotation angle sensor 17 at a specific time and derives torque related information related to the motor 11 currently being driven on the basis of sampled values. Subsequently, the controller 100 controls the switching elements S1 to S6 of the inverter 13 such that the motor 11 can output a value corresponding to a torque command value (a target torque value to be obtained through the motor 11) for the motor 11, which is input from the outside, on the basis of a result of comparison between the torque command value and the torque related information related to the motor 11 currently being driven, which is derived on the basis of the sampled values.

Here, the controller 100 determines a control time for controlling the inverter 13 in association with the PWM signal. For example, the controller 100 samples signals input from the sensors 15 and 17 at specific points in time corresponding to sections that the PWM signal is higher or lower than a predetermined value, performs predetermined operations for control using sampling results to determine a duty cycle (duty ratio) of the pulse width modulation signal, and applies the duty cycle (duty ratio).

In an exemplary embodiment of the present invention, the controller 100 arbitrarily changes a point in time corresponding to a section that the PWM signal is high in which high and low states are repeated while maintaining the cycle (frequency) of the PWM signal. As described above, the control operation of sampling the signals input from the sensors 15 and 17 and performing the predetermined operations for control using sampling results to determine the duty cycle (duty ratio) of the PWM signal is performed in association with a section that the PWM signal is high or low, and thus a time at which the control operation is performed arbitrarily changes. That is, the controller 100 can arbitrarily change a point in time at which a section that the PWM signal is high appears while maintaining the cycle of the pulse width modulation signal to change the sampling time and the control operation time by an arbitrary time.

Figure 2:
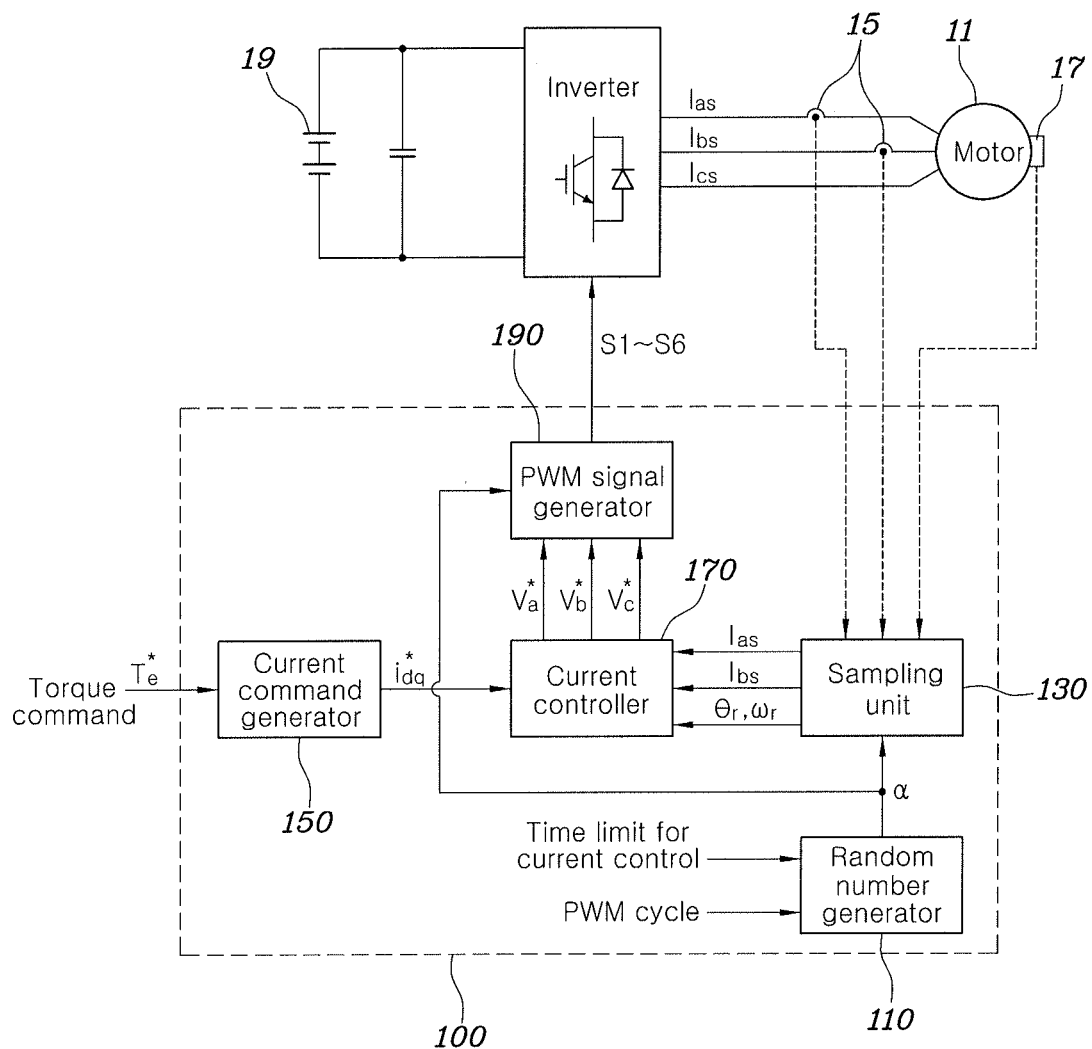
FIG. 2 is a block diagram showing a controller of the system for controlling an inverter for driving a motor according to an exemplary embodiment of the present invention, shown in FIG. 1, in more detail.

FIG. 2 is a block diagram showing the controller of the system for controlling an inverter for driving a motor according to an exemplary embodiment of the present invention, shown in FIG. 1, in more detail.

Referring to FIG. 2, the controller 100 may include a random number generator 110, a sampling unit 130, a current command generator 150, a current controller 170 and a PWM signal generator 190.

The random number generator 110 may randomly generate a setting time α used to arbitrarily change a point in time corresponding to a section that the PWM signal is high in the controller 100 as described above. Although a random number refers to a number having a random value, a random number may be a random setting time corresponding to a change quantity of a point in time corresponding to a section that the PWM signal is high in various embodiments of the present invention.

In the description and claims of the present invention, a section that a PWM signal is high or low refer to periods in which a PWM signal generated in the PWM signal generator 190 turns the switching elements on/off.

A known random number generation algorithm may be applied to generate the random setting time α in the random number generator 110.

The size of the random setting time α determined in the random number generator 110 needs to be limited on the basis of a time required for the control operation performed in association with the PWM signal and the cycle of the PWM signal. Such random number limitation will be described later in more detail.

The sampling unit 130 samples detection signals provided by the current sensor 15 and the rotation angle sensor 17 at a specific time and determines a sampling time on the basis of the random setting time generated in the random number generator 110. In various embodiments of the present invention, the temporal position of a section that the PWM signal is high is changed by the random setting time α in a state in which the cycle (frequency) of the PWM signal is fixed to a predetermined value. Accordingly, the sampling unit 130 may be aware of the cycle of the PWM signal in advance and thus can recognize the sampling time set in association with the PWM signal using the random setting time α.

The controller 100 may control a motor driving current from a time at which driving current detection values $I_{as}$ and $I_{bs}$ and a rotor angle detection value $\theta_r$ are generated through sampling performed in the sampling unit 130.

The current command generator 150 generates a current command $i_{dq}*$ corresponding to a torque command $T_e*$ input from the outside thereof on the basis of the torque command, and the current controller 170 generates an actual current measurement value which may be compared with the current command $i_{dq}*$ using the driving current detection values $I_{as}$ and $I_{bs}$ and the rotor angle detection value $\theta_r$, compares the current command with the actual current measurement value to obtain a difference therebetween, and then generates three-phase voltage commands $V_a*$, $V_b*$ and $V_c*$ of the motor for eliminating the difference using PI control or PDI control.

The PWM signal generator 190 generates a PWM signal having a duty which has been adjusted such that voltages corresponding to the three-phase voltage commands $V_a*$, $V_b*$ and $V_c*$ may be applied and provides the PWM signal to the switching elements S1 to S6 of the inverter 13. In various embodiments of the present invention, the PWM signal generator 190 may receive the random setting time α and change a point in time corresponding to a section that the duty-adjusted PWM signal is high by the random setting time α.

Detailed operations of the current command generator 150, the current controller 170 and the PWM signal generator 190 are known and thus may be easily understood by those skilled in the art without additional description. However, various embodiments of the present invention are characterized in that the PWM signal generator 190 generates a PWM signal having a predetermined cycle (frequency) and an adjusted duty cycle and changes a section that the generated PWM signal is high by the random setting time α using a conventional technique.

A method for controlling an inverter for driving a motor according to an exemplary embodiment of the present invention may be realized by the system for controlling an inverter for driving a motor according to an exemplary embodiment of the present invention, configured as described above. The operation of the system for controlling an inverter for driving a motor according to an exemplary embodiment of the present invention will be further understood through description of the method for controlling an inverter for driving a motor according to an exemplary embodiment of the present invention, which will be described below.

Figure 3:
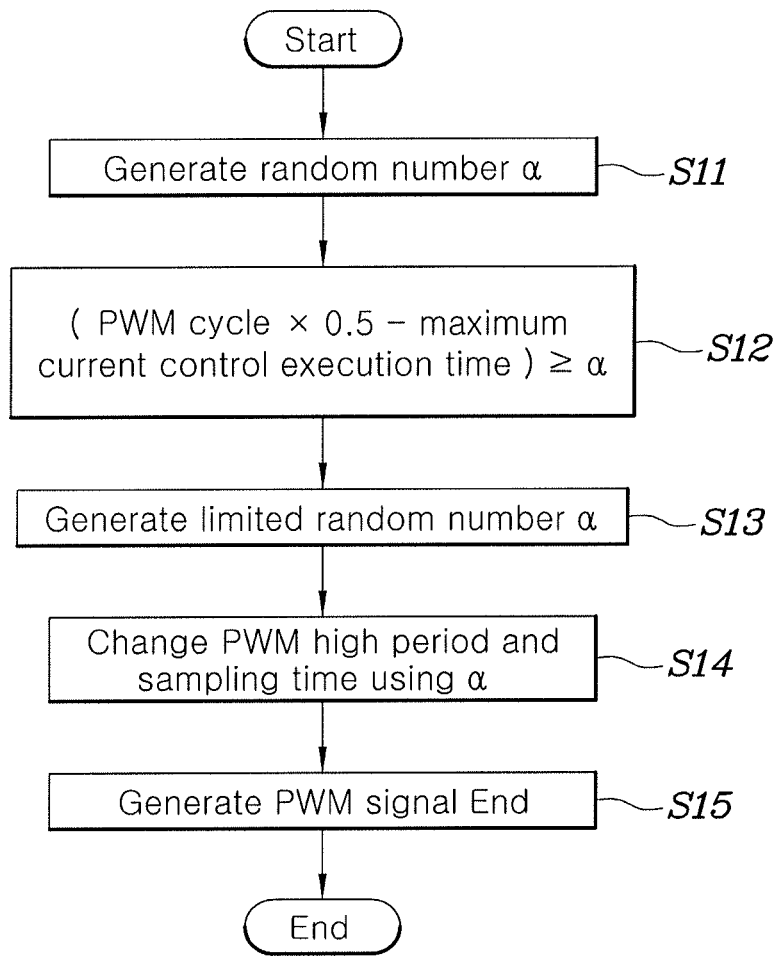
FIG. 3 is a flowchart showing a method for controlling an inverter for driving a motor according to an exemplary embodiment of the present invention.
Figure 4:
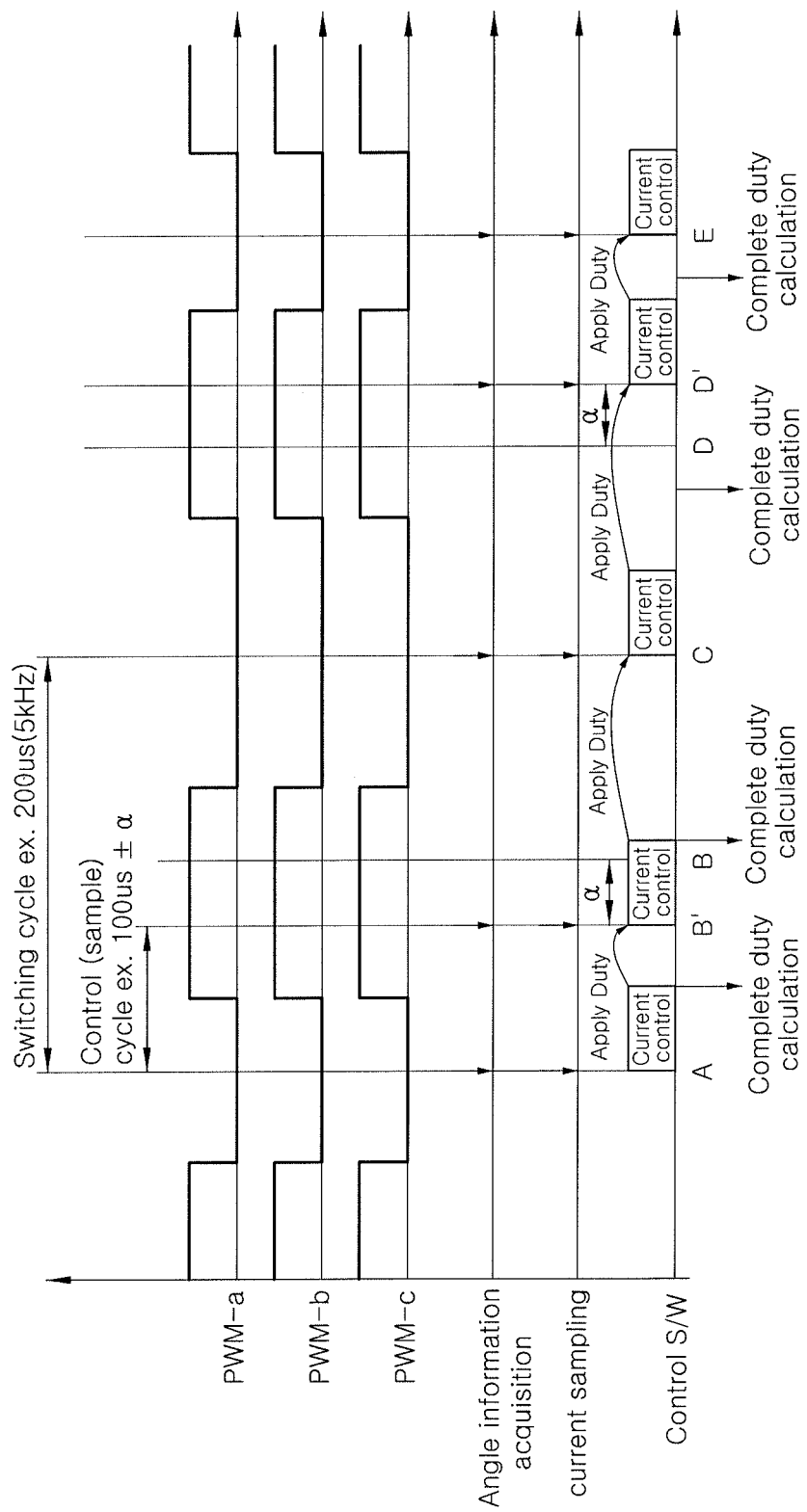
FIG. 4 is a graph showing a pulse width modulation signal, sampling time and control periods applied to the system and method for controlling an inverter for driving a motor according to an exemplary embodiment of the present invention.

FIG. 3 is a flowchart showing the method for controlling an inverter for driving a motor according to an exemplary embodiment of the present invention and FIG. 4 is a graph showing a PWM signal, sampling time and control periods applied to the system and method for controlling an inverter for driving a motor according to an exemplary embodiment of the present invention.

When the motor 11 starts to operate, a torque command $T_e*$ that a user intends to obtain from the motor 11 is input to the controller 100, and the controller 100 may generate a PWM signal for outputting the torque command $T_e*$ and provide the PWM signal to the inverter 13 to turn the switching elements of the inverter 13 on/off. A driving current provided to the motor 11 to control the motor 11 and the rotation angle of the rotor of the motor 11 are fed back to the controller 100. The controller 100 performs a control operation of determining the duty of the PWM signal for driving the switching elements of the inverter 13 on the basis of the torque command $T_e*$, driving current detection values $I_{as}$ and $I_{bs}$ generated by sampling signals detected by the current sensor 15 and the rotation angle sensor 17, and a rotor angle detection value $\theta_r$.

In the present basic motor control process, the random number generator 110 of the controller 100 determines the random setting time α which is a random number for changing (shifting) a point in time corresponding to a section that the PWM signal is high (S11), as shown in FIG. 3, in the method for controlling an inverter for driving a motor according to an exemplary embodiment of the present invention. The random number generated by the random number generator 110, that is, the random setting time α, needs to be limited in consideration of time limit for duty determination control performed by the controller 100 and the cycle of the PWM signal.

As described above, a point in time corresponding to a section that the PWM signal is high is changed by the random setting time α in various embodiments of the present invention. When the random setting time α is excessively long, duty determination control may be started before previous duty determination control is not finished, or the following duty determination control may be started before current duty determination control is finished.

This will be clearly understood with reference to FIG. 4.

In FIG. 4, signal waveforms PWM-a, PWM-b and PWM-c represent an example of a PWM signal of each phase, arrows in areas represented by "angle information acquisition" and "current sampling" indicate points in time at which detection signals of the rotation angle sensor 17 and the current sensor 15 are sampled, and "control S/W" indicates periods in which duty determination control is performed by the controller 100, that is, a time required to determine the duty of the PWM signal using sampled detection values and a torque command.

Furthermore, A, B, C, D and E in FIG. 4 indicate normal sampling times when the random setting time α is not applied, and B' and D' represent cases in which the random setting time α is applied and thus sampling time is changed in various embodiments of the present invention.

In the example shown in FIG. 4, the PWM signal is associated with sampling times such that sampling is started at points in time before and after a rising edge of the PWM signal, which are separated from the rising edge of the PWM signals by the same time interval. A sampling time may be a time at which duty determination control is performed. In the present example, one sampling time may start at a time elapsed from a start time of two preceding sampling operations by one cycle of the PWM signal.

As shown in FIG. 4, when the random setting time α is determined to be excessively long, time B' may arrive before duty determination control started at time A is finished, or time E may arrive before duty determination control started at time D' is finished.

To solve the present problem, the random number generated by the random number generator 110, that is, the random setting time α, is limited in step S12, as shown in FIG. 3.

The following expression may be applied to limit the random setting time α in step S12.

$$((PWM\ cycle \times 0.5) - \text{time limit for duty determination control}) \geq \alpha \quad [\text{Expression}]$$

That is, the random number generator 110 generates the limited random setting time α by limiting the random setting time α using Expression 1 (S13).

Subsequently, the sampling unit 130 generates a current detection value and a rotation angle detection value by sampling detection signals output from the current sensor 15 and the rotation angle sensor 17 using the limited random setting time α derived by the random number generator 110 (S14).

Thereafter, as described above, the current command generator 150 generates a current command $i_{dq}*$ corresponding to a torque command $T_e*$ input from the outside on the basis of the torque command, and the current controller 170 generates an actual current measurement value which may be compared with the current command $i_{dq}*$ using the driving current detection values $I_{as}$ and $I_{bs}$ and the rotor angle detection value $\theta_r$, compares the current command with the actual current measurement value to obtain a difference therebetween, and then generates three-phase voltage commands $V_a*$, $V_b*$ and $V_c*$ of the motor for eliminating the difference using PI control or PDI control. Furthermore, the PWM signal generator 190 generates a PWM signal having a duty which has been adjusted such that voltages corresponding to the three-phase voltage commands $V_a*$, $V_b*$ and $V_c*$ can be applied and provides the PWM signal to the switching elements S1 to S6 of the inverter 13. In various embodiments of the present invention, the PWM signal generator 190 may receive the limited random setting time α and change a point in time corresponding to a section that the duty-adjusted PWM signal is high by the random setting time α (S15).

As shown in FIG. 4, when the technique of starting sampling and duty determination control at points in time before and after a rising edge of the PWM signal, which are separated from the rising edge by the same time interval, is applied, a section that the PWM signal is high may be shifted forward or delayed by the random setting time a according to various embodiments of the present invention.

In conventional motor control, duty determination is controlled such that sampling is performed at the centers of a section that a PWM signal is high or low and thus sampling and duty determination control are performed at almost constant intervals, when sampling and duty determination control are performed twice within one cycle (represented as a switching cycle) of the PWM signal. Such a conventional motor control method may cause energy concentration because a sampling cycle is constant, and thus noise, vibration and harshness of an apparatus to which a motor is applied may be increased.

On the other hand, the method for controlling an inverter for driving a motor according to various embodiments of the present invention can arbitrarily determine a sampling time and a duty determination control time using a random setting time, instead of determining a constant sampling time and duty determination time, and thus reduce noise, vibration and harshness of a system to which a motor is applied through energy dispersion.

That is, according to various embodiments of the present invention, controllability may be improved by performing sampling and duty determination control twice within one cycle of a PWM signal, and noise, vibration and harshness of a system to which a motor is applied may be reduced by arbitrarily determining a sampling time and a duty determination control time using a random setting time.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for controlling an inverter for driving a motor, the system comprising:
   the motor;
   the inverter including a plurality of switching elements turned on or off by a pulse width modulation (PWM) signal, converting DC power supplied thereto into AC power according to on or off of the plurality of switching elements and providing the AC power to the motor;
   a current sensor for detecting and outputting a current provided to the motor;
   a rotation angle sensor for detecting and outputting a rotor angle of the motor; and
   a controller configured for performing a duty determination control for determining a duty of the pulse width modulation signal on a basis of values detected by the current sensor and the rotation angle sensor and a torque command of the motor, associating a time at which the duty determination control is performed with the pulse width modulation signal, and arbitrarily changing a time at which the duty determination control is performed by changing a point in time at which a section that the pulse width modulation signal is higher than a predetermined value appears depending on a random setting time.

2. The system according to claim 1, wherein the controller is configured to change the point in time at which the section that the pulse width modulation signal is higher than the predetermined value appears depending on the random setting time while maintaining a cycle of the pulse width modulation signal.

3. The system according to claim 2, wherein the controller is configured to perform the duty determination control at points in time before and after a rising edge of the pulse width modulation signal, which are separated from the rising edge, and a start time of one duty determination control is a time elapsed from a start time of two preceding duty determination controls by one cycle of the pulse width modulation signal.

4. The system according to claim 1, wherein the controller comprises:
   a random number generator for generating the random setting time;
   a sampling unit engaged to the random number generator and sampling the values output from the current sensor and the rotation angle sensor at a sampling time determined using the random setting time generated by the random number generator to generate a current detection value and a rotation angle detection value;
   a current controller engaged to the sampling unit and configured for generating a voltage command of each phase of the motor on a basis of the current detection value and the rotation angle detection value generated by the sampling unit and a current command corresponding to the torque command of the motor; and
   a pulse width modulation signal generator engaged to the current controller and generating a pulse width modulation signal for controlling the on or off of the switching elements of the inverter to output a voltage of each phase corresponding to the voltage command, and changing a point in time corresponding to the section that the pulse width modulation signal is higher than the predetermined value depending on the random setting time.

5. The system according to claim 4, wherein the random number generator limits a size of the random setting time on a basis of the cycle of the pulse width modulation signal and a time limit predetermined for the duty determination control.

6. The system according to claim 5, wherein the random number generator limits the size of the random setting time according to the following expression, $$(a \text{ cycle of the PWM} \times 0.5) - (\text{the time limit for the duty determination controp} \geq \alpha$$

wherein $\alpha$ is the random setting time.

7. The system according to claim 5, wherein a current command generator generates the current command corresponding to the torque command input from the outside thereof on a basis of the torque command.

8. The system according to claim 7, wherein the current controller generates an actual current measurement value and compares the current command with the actual current measurement value to obtain a difference therebetween, and generates three-phase voltage commands of the motor.

9. A method for controlling an inverter for driving a motor, the method comprising:
   determining a random setting time;
   determining a sampling time depending on the random setting time and sampling a motor driving current detection signal and a motor rotor angle detection signal at the determined sampling time; and
   generating a pulse width modulation (PWM) signal for controlling on or off of switching elements included in the inverter providing driving power to the motor on a basis of the sampled motor driving current detection signal and motor rotor angle detection signal and a torque command of the motor,
   wherein a point in time at which a section that the pulse width modulation signal is higher than a predetermined value, generated in the generating of the pulse width modulation signal, appears is changed depending on the random setting time, and the sampling time is associated with the pulse width modulation signal.

10. The method according to claim 9, wherein, in the generating of the pulse width modulation signal, the point in time at which the section that the pulse width modulation signal is higher than the predetermined value appears is changed depending on the random setting time while a cycle of the pulse width modulation signal is maintained.

11. The method according to claim 10, wherein, in the generating of the pulse width modulation signal, a duty determination control including the sampling and the pulse width modulation signal generation is performed at points in time before and after a rising edge of the pulse width modulation signal, which are separated from the rising edge, and a start time of one duty determination control is a time elapsed from a start time of two preceding duty determination controls by one cycle of the pulse width modulation signal.

12. The method according to claim 9, wherein, in the determining of the random setting time, a size of the random setting time is limited on a basis of a cycle of the pulse width modulation signal and a time limit predetermined for a duty determination control including the sampling and the pulse width modulation signal generation.

13. The method according to claim 12, wherein, in the determining of the random setting time, the size of the random setting time is limited according to the following expression, $$(\text{the cycle of the PWM} \times 0.5) - (\text{the time limit for the duty determination control}) \geq \alpha \quad (5)$$

wherein α is the random setting time.

* * * * *